United States Patent [19]
Schilling

[11] Patent Number: 4,994,630
[45] Date of Patent: Feb. 19, 1991

[54] SUSPENDED LIGHTWEIGHT CABLE SPLICE ENCLOSURE SLEEVE

[75] Inventor: Werner Schilling, Wildenheid, Fed. Rep. of Germany

[73] Assignee: RXS Schrumpftechnik-Garnituren GmbH, Fed. Rep. of Germany

[21] Appl. No.: 445,767

[22] Filed: Dec. 4, 1989

[30] Foreign Application Priority Data

Dec. 16, 1988 [DE] Fed. Rep. of Germany ....... 3842518

[51] Int. Cl.$^5$ ............................................ H02G 15/113
[52] U.S. Cl. ........................................ 174/41; 174/92; 174/93
[58] Field of Search ................... 174/41, 92, 93, 77 R; 428/432, 433, 461

[56] References Cited

U.S. PATENT DOCUMENTS

| | | | |
|---|---|---|---|
| 3,624,594 | 11/1971 | Trimble | 174/93 |
| 3,701,835 | 10/1972 | Eisele et al. | 174/41 |
| 4,084,067 | 4/1978 | Gillemot | 174/92 |
| 4,232,184 | 11/1980 | Faust | 174/41 X |
| 4,486,620 | 12/1984 | Ball et al. | 174/41 |
| 4,721,830 | 1/1988 | Dagan et al. | 174/41 |
| 4,831,215 | 5/1989 | Clark et al. | 174/41 X |

FOREIGN PATENT DOCUMENTS

| | | | |
|---|---|---|---|
| 2401552 | 7/1975 | Fed. Rep. of Germany | 174/93 |
| 20875 | 7/1970 | Japan | 174/93 |
| 2046030 | 11/1980 | United Kingdom | 174/93 |

Primary Examiner—Morris H. Nimmo
Attorney, Agent, or Firm—Hill, Van Santen, Steadman & Simpson

[57] ABSTRACT

A cable splice enclosure sleeve including a longitudinally slit substantially tubular sleeve made of a flexible material, preferably a multi-layer foil; reinforcing strips attached along edges of the slit, a locking strip engaging both edges of the slit in sealing relationship; and suspension devices attached along the locking strip to suspend the sleeve from an object such as a suspended cable.

27 Claims, 6 Drawing Sheets

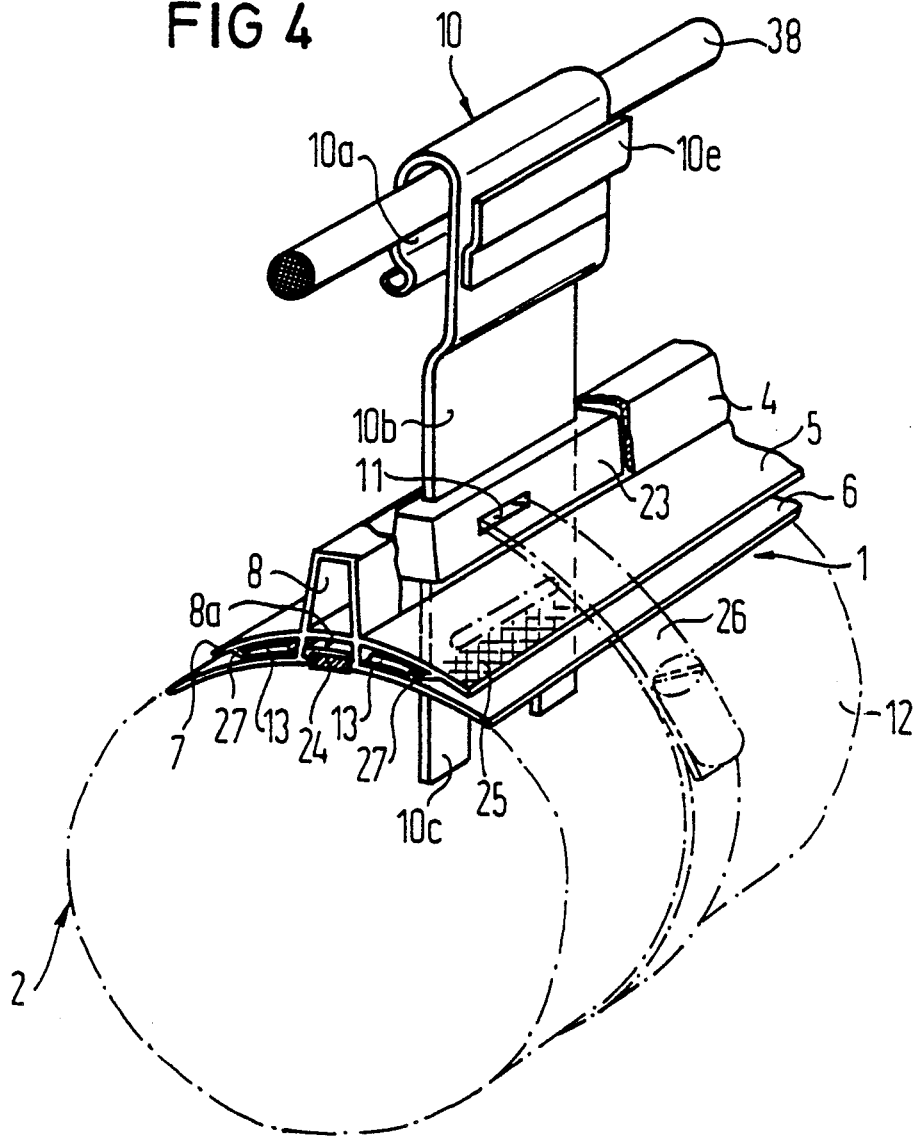

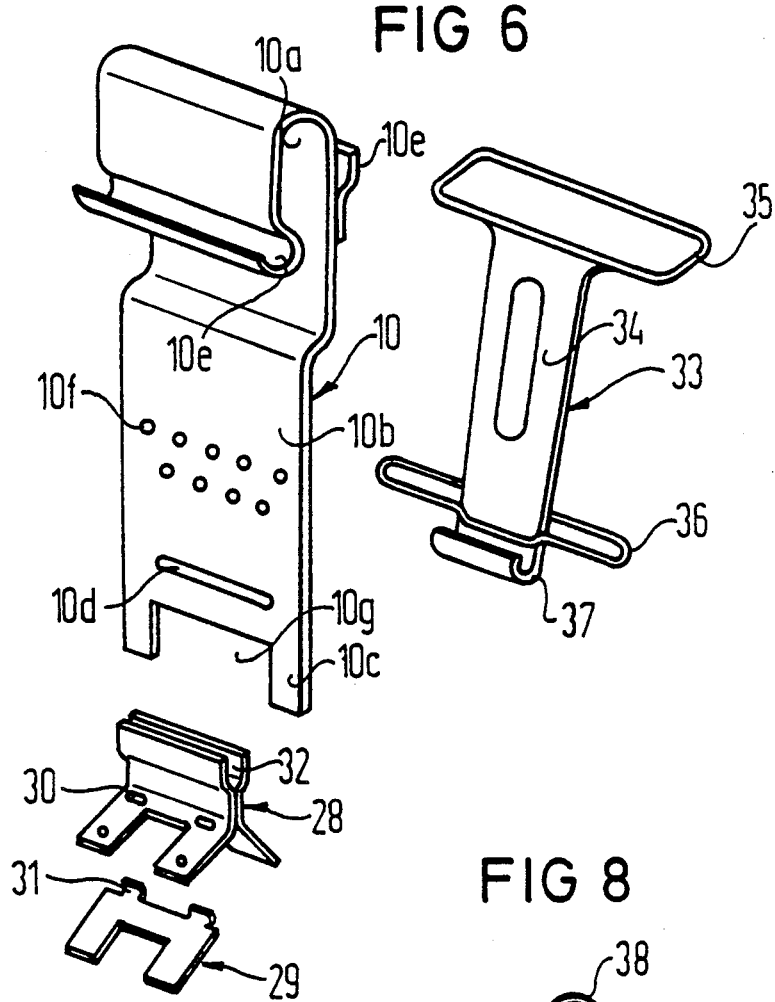
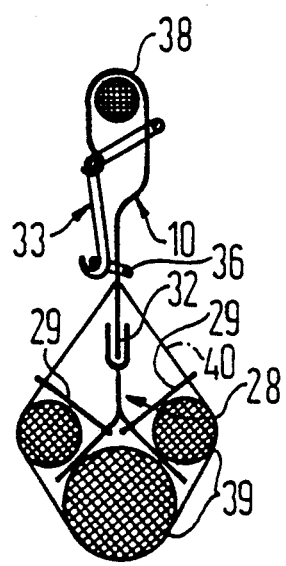
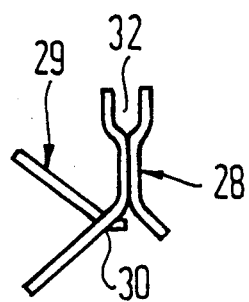

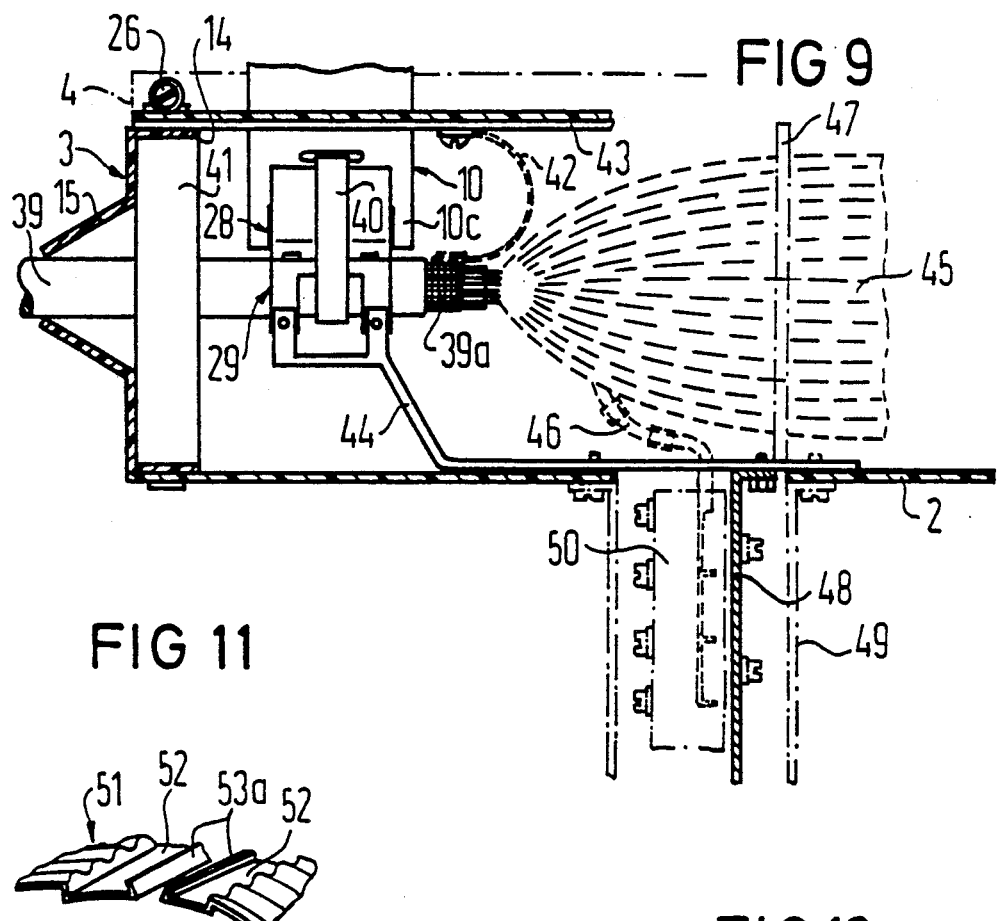
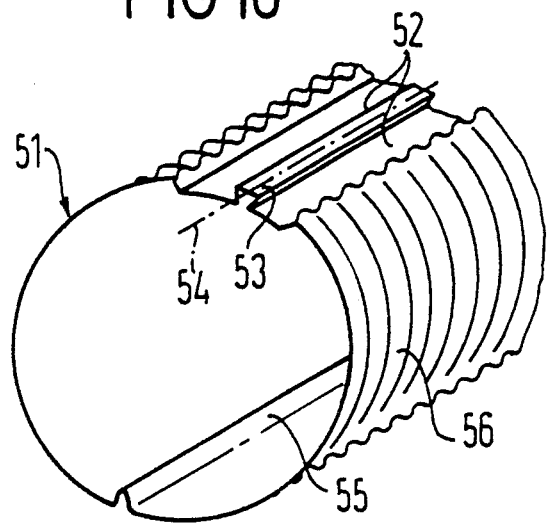

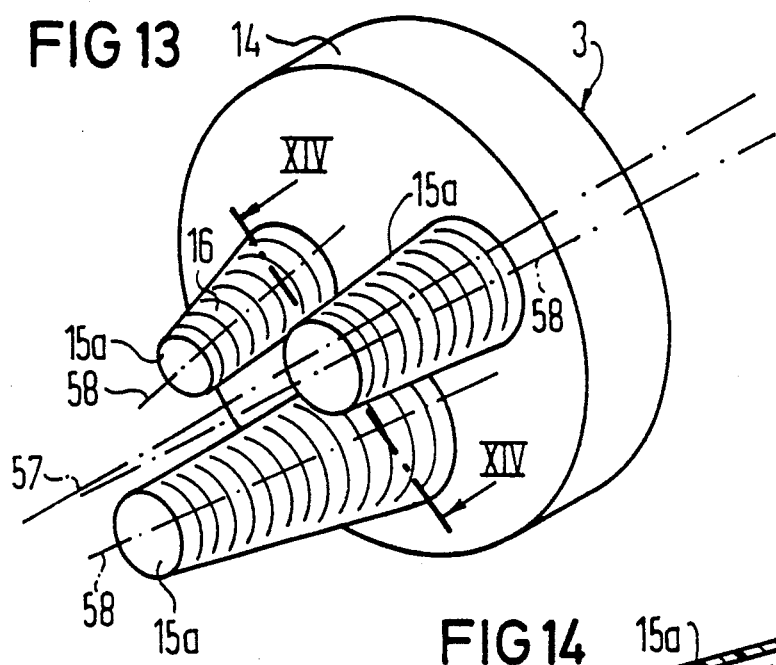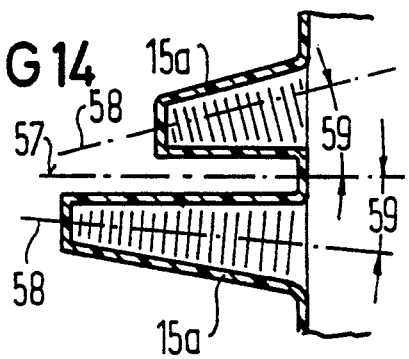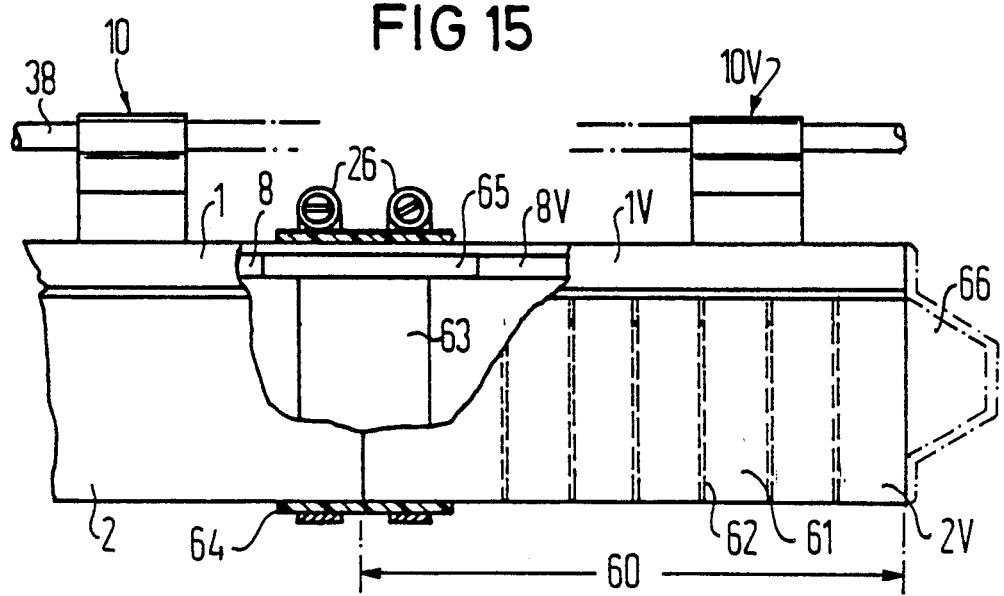

SUSPENDED LIGHTWEIGHT CABLE SPLICE ENCLOSURE SLEEVE

BACKGROUND OF THE INVENTION

The present invention is generally directed to cable splice enclosures More particularly, the invention is directed to a suspended sleeve comprising a socket pipe and two cable introduction regions at longitudinal ends thereof and suspension devices for suspending the sleeve from a carrying cable. This type of sleeve can be referred to as an aerial sleeve because it generally is suspended from a cable in the air.

U.S. Pat. No. 4,084,067 discloses such an aerial sleeve. It may be seen therein that the sleeve housing is constructed as a carrying sleeve member (i.e., it carries the weight of the cables therein) that must be correspondingly heavy and reinforced in order to satisfy the mechanical properties demanded of it.

SUMMARY OF THE INVENTION

It is an object of the present invention to provide an suspended cable splice enclosure sleeve (aerial sleeve) having a lightweight structure wherein the necessary protective functions are fully met by an envelope that surrounds the cables, but wherein the mechanical requirements with respect to carrying weight, the tensile forces, and pressure forces are transferred to other specific parts of the sleeve.

To this end, the invention provides a suspended cable splice enclosure sleeve (aerial sleeve) of the type initially set forth wherein the socket pipe comprises a flexible and longitudinally slit envelope that is not self-supporting and thus, the envelope comprises reinforcements along edges of the slit. The edges of the slit are grasped in sealing fashion by a longitudinally proceeding locking profile strip that also serves as a carrying rail; this carrying rail being formed as a dimensionally stable carrying element that accepts the weight of the sleeve and splice parts enclosed therein. Suspension means for suspending the carrying rail from an object such as a cable is/are arranged at the carrying rail. Supporting elements for supporting the flexible envelope are arranged at least at the longitudinal ends of the envelope.

The basic idea of an aerial sleeve realized in lightweight structure according to principles of the invention may thus be seen in that the weight of the cable and of all splices and of other forces that additionally occur do not influence the sleeve envelope member, so that the sleeve envelope member itself is attached so as to "float", so to speak, about the connecting location and practically has to carry only its own weight. All standard types of sleeves can be replaced given such a basic idea such as, for example, through sleeves and branching sleeves with or without additionally attachable terminal housings. Such a lightweight structure nonetheless yields a high mechanical stability, whereby all sleeve sizes are based on the same, uniform design principle.

An advantage of the invention is that, in a certain way, a modular system derives from this structure for expanding a simple connecting sleeve so as to form a "terminal sleeve". Another advantage is that in addition, a shielded through-connection can be attached. It is yet another advantage that the tension of all introduced cables can be adequately intercepted. Last but not least, it is a further advantage that a simple adaptation of the respective mounting arrangement can be carried out on the basis of selection of appropriate extension units.

These advantages are essentially achieved because the cable splice enclosure sleeve of the invention is formed of three functional parts: first, a carrying rail that is provided with closure strip elements; second, a one-piece, slit socket pipe formed as an envelope; and third, closure members at the two ends of the socket pipe. The respective individual jobs can be optimized utilizing this division of the sleeve into functional units.

These and other advantages, as well as these and other embodiments, will become more apparent with reference to the following detailed description of the presently preferred embodiments and accompanying drawings.

BRIEF DESCRIPTION OF THE DRAWINGS

FIG. 4 illustrates the structure of a carrying rail/locking profile strip with suspension means of the sleeve of FIG. 1;

FIG. 5 illustrates a cross-sectional view of the carrying rail of FIG. 4;

FIG. 6 illustrates individual parts of the suspension means and a cable clamp;

FIG. 7 illustrates the cable clamp in end view;

FIG. 8 illustrate the entire carrying unit;

FIG. 9 illustrates in cross-sectional view, the cable introduction region of the aerial sleeve of FIG. 1;

FIG. 10 illustrates a socket pipe;

FIG. 11 illustrates in detail, a section adjacent a slit region of the socket pipe of FIG. 10;

FIG. 12 illustrates a connection arrangement for connecting a terminal housing;

FIG. 13 illustrates an alternate embodiment of the invention employing a sleeve head having three cable introduction connectors;

FIG. 14 illustrates in cross-sectional view, the sleeve head according to FIG. 13 taken along the line XIV-XIV;

FIG. 15 illustrates an extension set for an aerial sleeve embodying principles of the invention;

DETAILED DESCRIPTION OF THE PRESENTLY PREFERRED EMBODIMENTS

Figure 1:
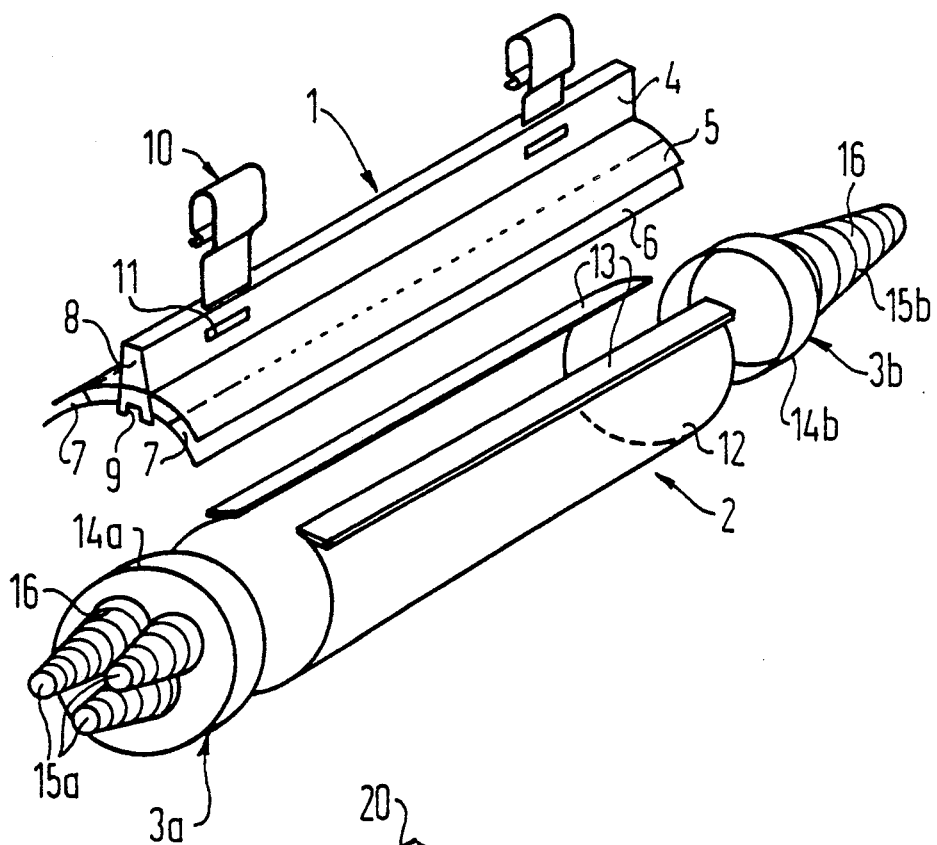
FIG. 1 illustrates an aerial sleeve embodying principles of the invention.

In FIG. 1, there is illustrated a cable splice enclosure sleeve/aerial sleeve embodying principles of the invention. The sleeve can be divided into three functional parts: a carrying rail/locking profile strip 1, a socket pipe/envelope 2, and sleeve heads/ends 3a and 3b.

It can be seen that the carrying rail 1 is provided with hook-like suspension means/devices 10 for suspending the sleeve from a carrying cable and that the rail 1 functions as a closure element comprising longitudinal channels 7 that are defined by upper and lower curved surfaces 5 and 6. Two thickened (or profiled) longitudinal edges 13 of a slit cylindrical envelope 12 are received within these channels 7 when the aerial sleeve is closed and are pressed therein in sealing fashion with the assistance of strap retainers that surround the envelope 12. As illustrated in FIG. 4, it can be appreciated that the straps are threaded through slots 11 in the carrying rail 1.

The strap retainers are positioned adjacent sleeve regions that contain supporting members in the inside as interior abutments. Given an appropriately stiff or rigid design, cylindrical parts 14a and 14b of the sleeve heads 3a and 3b, for example, can serve as such supporting members.

Depending on what is being introduced, the sleeve heads 3a and 3b have one or more conical cable introduction connectors 15a and 15b that are provided with diameter markings 16. It can be appreciated that the connections 15a and 15b are severed at these markings so as to form appropriately sized opening therein.

The carrying rail 1 is formed to have a multi-chamber profile, so that a casting block of, preferably, a hardening resin is introduced as an anchor in a chamber 8 of a rail 4, in the region of the suspension devices 10. The suspension devices 10 are attached to the rail 4 so as to secure the suspension devices to the carrying rail 1.

Figure 2:
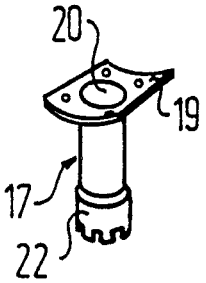
FIG. 2 illustrates a tubular terminal housing employable in the sleeve of FIG. 1.

In FIG. 2, there is illustrated a cylindrical container 20 that, serving as terminal housing 17, can be attached to the socket pipe 2 via a flange 19 with, for example, screws. This additional receptacle space is accessible via an appropriate removable termination or cap 22.

Figure 3:
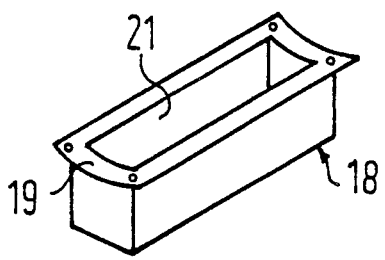
FIG. 3 illustrates a box-shaped terminal housing employable in the sleeve of FIG. 1.

In FIG. 3, there is illustrated a rectangular container 21 that also can serve as a terminal housing 18. The container 21 also comprises a flange 19 that can likewise be subsequently attached at terminal housing when needed.

In FIG. 4 there are illustrated the details of an introduction of the suspension means 10 into the carrying rail 1. It can be appreciated that the suspension means 10 essentially comprises a strap whose stiff/rigid upper end 10a is bent into a U-shaped hook for attachment to a carrying cable 38. A securing flange 10e is included for attachment thereto of a rapid-action block shackle. A strap part 10b is introduced into and through the rail 4 of the carrying rail 1 and into the interior of the sleeve.

As explained, the rail 4 is formed to be hollow as a chamber 8 and is filled with a casting block 23 of casting resin in the region of the introduction of the suspension device 10, so that the suspension device 10 introduced therein can be attached thereto. The slot 11 allows threading therethrough of a strap retainer 26 that embraces the socket pipe 2. The slot 11 extends through the strap 10b.

The introduction of the slit edges 13 of the envelope 12 into the two channels 7 of the carrying rail 1 also becomes clear from FIG. 4. It can be seen that the upper surface 5 of the channels 7 is bent more in an inward direction (i.e., smaller curvature radius) than the lower surface 6. Further, the surface 5 is provided with hook members 27 that engage the edges 13 to secure the edges 13 therein and to prevent the socket pipe 2 from sliding off the carrying rail 1. Further, this surface 5 can also be coated with an adhesive and, potentially, sealing material 25.

The carrying rail 1 also comprises a longitudinal undercut center channel 9 into which, for example, a grounding through connection rail 24 can be clamped.

The profile of the interior chamber of the carrying rail 1 may be seen in the cross sectional view of FIG. 5. It can be seen that the two channels 7 for the acceptance of the edges 13 of the envelope 12 preferably are formed symmetrically relative to one another by the surfaces 5 and 6. The hook members 27 that secure longitudinal edges 13, are more clearly visible. It also is clearly shown how the suspension means 10 has its center part 10b anchored in the casting block 23 that was introduced into the chamber 8. An end 10c of the suspension means 10 can be seen to terminate within the interior of the aerial sleeve envelope.

The rail 4 of the carrying rail 1 is produced, for example, via an extrusion molding process and is then cut to the appropriate size for the respective product type and is provided with the slots, such as the slots 11, for the various passages. The most expedient carrying rail profile contains two middle chambers 8 and 8a closed by side walls disposed at a slight angle, two chambers fashioned as channels 7 joined to said chambers 8 and 8a on opposite sides thereof.

In the central region of the chamber 8a, the lower surface 6 preferably has an undercut indentation into which a ribbon conductor can be snapped as grounding rail. The anchor 23 of the suspension means 10 is cast out in the middle chamber 8 in the region of the passage with hot-melt adhesive, casting resin, or the like. Due to the undercut of the obliquely placed chamber walls, the casting block 23 cannot be pulled out of the rail 4.

The outer regions of the surfaces 5 and 6, serve as glideways for the socket pipe 2 to be introduced thereinto. A splash-proof gluing is achieved via placement of a pressure-sensitive coating of the inside of the upper surfaces 5 and corresponding parts of the socket pipe 2. The end-face seal of the chamber rail 4 is provided by the introduction at the ends of permanent plastic material.

What is achieved by combining two thermoplastic materials or modifications thereof in a fiberglass-filled and unfilled embodiment is that the carrying rail 1 is constructed to be rigid and tensile in the region of the middle chamber but that the edges and outer webs remain flexible. Copolymer-modified polycarbonates, polyamides and polyethylene that are processed in tandem extrusion with or without fiberglass fill come into consideration as a fill. What is achieved via the aforementioned combination of materials is that one and the same rail adapts in coverage for over broad ranges to socket pipes or, respectively, closing members having different diameters. Only two profile sizes are thereby required for the entire range of sleeve diameters from about 40 through 240 m. After removal of the strap retainers 26, a dismantling of the socket pipe 2 is possible by lifting the flexibly fashioned edge zones of the upper surfaces 5 of the carrying rail 1.

In FIG. 6 there is illustrated the main part of a suspension device 10. It can be seen that an end 10a is bent in a U-shape for the acceptance of the carrying cable (i.e., so the device 10 can be suspended from a cable). Two securing clips 10e are included that engage a rapid-action block shackle 33 that has a ring part 35, as depicted in FIG. 8. The suspension device 10 is secured to the carrying cable with the assistance of a locking eyelet 36 and appropriate positioning of the shackle 33. The center part 10b has openings 10f that, when casting the casting block 23, serve the purpose of assuring that a reliable anchoring in the carrying rail 1 ensues (i.e., casting block material extends into and through the openings 10f).

The lead-through slot 10d for the strap retainer 26 may also be seen and the cut-out 10g into which a cable clamp 28 can be introduced is situated at the lower end 10c. This cable clamp 28 essentially has a essentially V-shaped spread into which a cable can be introduced and fixed with the assistance of a strap retainer 26. The plurality of cables to be accepted can be increased with auxiliary plates 29 that can be introduced into the slots 30 of the cable clamp 28.

FIG. 7 illustrates in side view an embodiment of a cable clamp 28 expanded with an auxiliary plate 29. This cable clamp 28 is capable of having an upper channel 32 thereof introduced into the afore-mentioned cutout 10g of the suspension means 10.

FIG. 8 illustrates how the suspension device 10 is secured to the carrying cable 38. It should be apparent that the socket pipe 2 is not a factor in the suspension and serves only the purpose of protecting the cables within the sleeve. Accordingly, the problems of suspending and fixing cable in the aerial sleeve are accomplished with the suspension means 10.

As already set forth, the suspension means 10 is hooked to the cable 38 and is secured thereon via the rapid-action lock shackle 33. The cable clamp 28 with its auxiliary plates 29 is inserted over the channel 32 in the interior of the aerial sleeve at its lower end, in the recessed region 10g of the suspension means 10. The individual cables 39 are introduced into the V-shaped guides that thereby arise and are fixed with the assistance of a strap retainer 40. This strap retainer 40, however, also serves the purpose of fixing the cable clamp 28 to the suspension means 10 and is threaded through the slot 10d. Accordingly, a stable suspension system with which the carrying and fixing problems of the individual parts are resolved independently of the socket pipe is established.

The insides of the V-shaped cable clamp 28 and of the plug-in plates 29 are provided with notchings or toothings that press into the cable jackets secured therein under the closing pressure of the strap retainer during assembly. In order to enhance the positive lock, additional toothed fixing elements are placed on the cable binder at the locations at which the cable jackets do not come into contact with the toothed surfaces of the cable clamp 28 or of the plug-in plates 29. The rectangular recess of the cable clamp 28 or, respectively, plug-in plates 29 simultaneously provides that small cable diameters are also adequately wrapped by the strap retainer. The cable clamp 28 itself contains an axially non-dislocatable guide in the cutout 10g of the suspension means. The middle position of the cable can be varied to a limited degree by introducing spacer pins.

The attachment of the suspension means to the carrying cable is accomplished in the first step of assembly so that the rapid-action block shackle 33 is first plugged over the suspension means 10 and the cable is subsequently introduced into the securing clips 10e against the resistance of the backsprung, free leg. The free leg of the suspension means is then bent in the direction of the stationary part with the rapid-action lock shackle 33 and the end of the rapid-action lock shackle 33 is fixed with the locking eyelet 36 manually placed thereover. The suspension means 10 is thus fixed to the carrying cable 38.

In FIG. 9 there is illustrated in partial cross sectional view a cable introduction region of the sleeve. The introduction of a cable 39 through a cable introduction connector 15 of a sleeve head 3, in whose cylindrical part 14 a separate ring-shaped supporting member 41 is placed can be seen. The strap retainer 26 is also illustrated as surrounding the socket pipe 2 in this region. The profile 4 of the carrying rail 1 is only suggested here. The suspension means 10 has its end 10c guided into the interior of the aerial sleeve where a cable clamp 28 with an auxiliary plate 29 is arranged.

A cable 39 is placed in the V-shaped cut-out of the clamp 28 and is clamped thereto via the strap retainer 40 that is threaded through the slot 10d of the suspension means 10.

A crimped rounding connection rail 44, for example, is screwed to the auxiliary plate 29. It is indicated at the upper part of the aerial sleeve that a grounding connection rail 43 can also be guided into the profile of the carrying rail 1. A connection 42 to ground is shown that is connected to the cable shielding 39a. This is then followed, for example, by a cable splice 45 from which a branching cable group 46 extends into an attached terminal housing 49. The terminal housing 4g is secured to the socket pipe 2 via a screw. A fastening angle 48 for a terminal block 50 is attached to the grounding rail 44. It is indicated in the central region of the aerial sleeve that an additional supporting element 47 for the flexible envelope can also be provided.

FIG. 10 illustrates a cylindrical thin-wall socket pipe 51 manufactured, for example, via a bubble molding technique so that the pipe 51 receives its stiffness on the basis of a special structuring, for example corrugation. A bending groove 55 is applied in this base member along a generating line. After slitting of the pipe 51 along a line 54 in the region of an applied bead 53, the socket pipe 51 can be opened despite the corrugated structure. Two symmetrically smooth surfaces 52 that form sealing surfaces upon insertion into the channels 7 of the carrying rail 1 are formed on opposite sides of the applied bead 53.

FIG. 11 illustrates in detail the resulting structure in the slitted region along the generating line 54. As a consequence of the undercut shaping of the bead 53, two obliquely placed longitudinal edges 53a are produced so that, after introduction of the edges 53a into the channels 7 of the carrying rail 1, the edges 53a lock to hooks 27 situated there.

FIG. 12 illustrates how set-offs 54 can also be integrally included in the manufacture of a socket pipe 51 via a bubble molding technique, these set-offs 54, for example, being capable of serving as draining pieces for a terminal housing 55. A terminal housing 55 connected to a set-off via a union nut 56 that is screwed onto an integrally formed threaded portion and that presses against the flange of the terminal housing 55. In a manner similar to such set-offs for a terminal housing, sleeve heads or multiple connectors for introducing a variety of items can be co-applied.

FIG. 13 illustrates how known sleeve heads 3 can be improved so that the integrally applied cable introduction connectors 15a are not arranged parallel to the principal axis 57 of the aerial sleeve but instead are disposed at inclines at acute angles thereto. The cable introduction connectors 15a are conically fashioned and are provided with annular markings 16 corresponding to various diameters. In order to counteract the closing pressure of the strap retainer that surrounds the cylindrical portion of the aerial sleeve and since the intent is to manufacture a sleeve head of a flexible, ductile material, a metal supporting ring is provided at the cylindrical portion 14 of the sleeve head 3. It can be appreciated that a compact arrangement oriented toward the center axis 57 of the aerial sleeve is provided due to the inclination of the cable introduction connectors 15a toward the axis 57.

FIG. 14 illustrates the above-described slant of the cable introduction connectors 15a at acute angles 59 relative to the principal axis 57 of the aerial sleeve in a sectional view.

FIG. 15 illustrates an extension set 60 with which a lengthening of an aerial sleeve can be carried out. The only items needed for this purpose are: a further section of socket pipe 61, an extension piece of the carrying rail 1V; an additional suspension means 10V; and a sealing band 64 with strap retainers 26. The extension piece of the carrying rail 1V is aligned with the assistance of a profile rod 65 that engages the chamber 8 of the chamber profile of the original carrying rail 1 and the extension piece is then slipped on until it abuts. The extension piece of the pipe socket 61 is then introduced into the channels of the carrying rail 1V in sealing fashion as before. The annular cap situated between the original aerial sleeve and the attached extension part is bridged with the sealing band 64 and is clamped in sealing fashion with strap retainers at both sides of the annular gap, a supporting ring 63 inserted inside the aerial sleeve serving as an abutment. A new sleeve head 66 is then inserted at the open end of the extension piece in the manner already set forth. Further supporting members 62 for supporting the sleeve are provided within the interior.

Some examples of the inventive structure of a flexible foil employable as the sleeve are set forth below with reference to FIGS. 16 through 19. It can be appreciated that the sequence and plurality of individual foil layers can be varied without modifying the basic principle.

Figure 16:
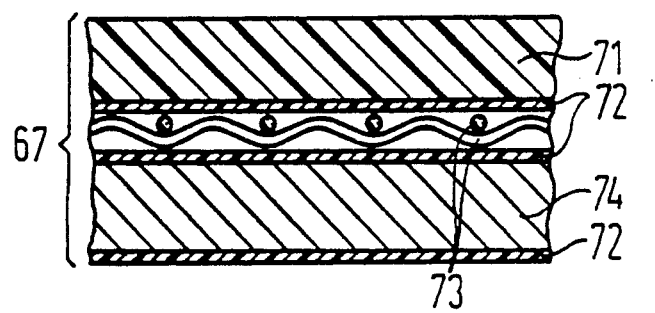
FIG. 16 illustrates a first example of a laminate structure for an envelope for a sleeve embodying principles of the invention.

FIG. 16 illustrates a foil 67 comprising a cover layer 71 of polyethylene having an inwardly facing adhesion layer 72 made of a copolymer; a reinforcing layer 73 attached thereto preferably composed of glass fibers arranged in crossed or woven form; and a metal foil 74, preferably made of steel, that is surrounded on all sides with further adhesion layers 72. Based on the required properties, the following values are especially suitable for the respective thicknesses of the individual layers:

| Cover layer of plastic, preferably polyethylene: | 200 μm, preferably 150 μm. |
| --- | --- |
| Adhesive layers of a copolymer, preferably polyethylene acrylic acid ester: | 50 μm, preferably 30 μm. |
| Reinforcing layer, preferably of glass fibers: | 150 μm, preferably 120 μm. |
| Metal foil, preferably of steel: | 200 μm, preferably 150 μm. |

These values are valid for all exemplary embodiments discussed herein.

Figure 17:
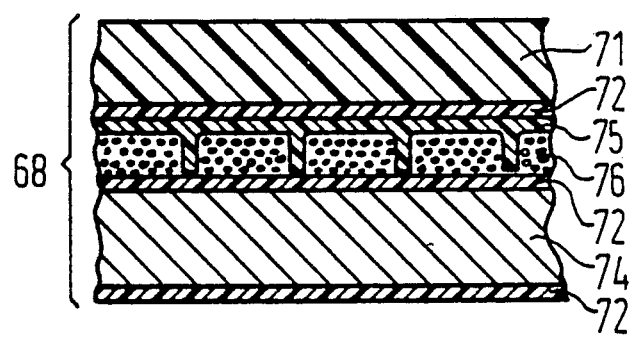
FIG. 17 illustrates a second example of a laminate structure for an envelope for a sleeve embodying principles of the invention.

FIG. 17 illustrates a second embodiment of a flexible foil 68 wherein the reinforcing layer is formed by a cavitied profile 75 having a thickness of about 300 μm. The individual cavities of this cavitied profile 75 are filled with a sealing material 76, preferably a bitumen sealing compound. This embodiment has the advantage that a certain "self-healing" occurs given a puncture or cut wound to the foil 68 since the sealing material 76 fills out and closes the wound in sealing fashion. The above-described layers are also provided.

Figure 18:
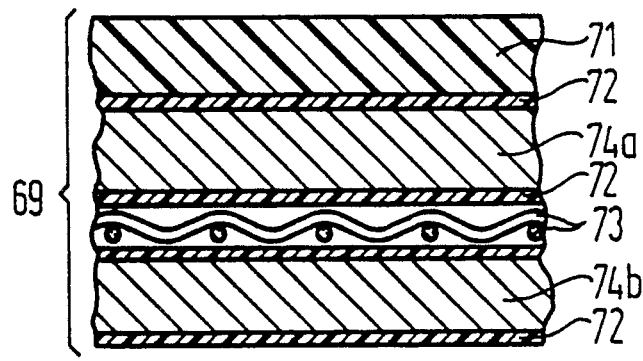
FIG. 18 illustrates a third example of a laminate structure for an envelope for a sleeve embodying principles of the invention.

In addition to the layers already set forth in FIG. 16, FIG. 18 illustrates another embodiment including a further metal foil 74a, preferably likewise composed of steel, that is introduced between the cover foil 71 coated with the copolymer and the reinforcing layer. Mechanical stiffness of the flexible foil is thus increased by these two, embedded metal layers 74a and 74b, while the flexibility is largely preserved.

Figure 19:
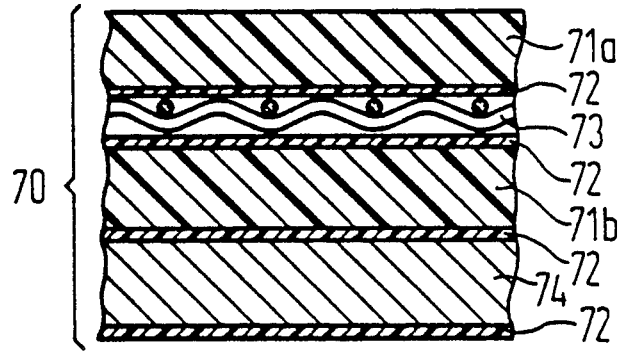
FIG. 19 illustrates a fourth example of a laminate structure for an envelope for a sleeve embodying principles of the invention.

In FIG. 19, yet another foil is illustrated wherein, in addition to the layers already set forth in FIG. 16, a further plastic layer 71b, preferably of polyethylene, is embedded between the reinforcing layer 73 and the copolymer layer 72 of the metal foil 74.

As discussed above, the sequence of individual layers as well as the materials of the individual layers can be modified to satisfy individual requirements. The flexible foils set forth in FIGS. 16 through 19 can be manufactured as half-finished goods for cable sleeves in simple and standard procedures, these half-finished goods being then shaped by appropriate customizing to form the cable sleeve in the fashion already set forth above.

While preferred embodiments has been shown, modifications and changes may become apparent to those skilled in the art which shall fall within the spirit and the scope of the invention. It is intended that such modifications and changes be covered by the attached claims.

I claim:

1. A cable splice enclosure sleeve comprising:
    (a) a longitudinally slit substantially tubular envelope made of a flexible material;
    (b) reinforcing strips attached along edges of the envelope formed by the slit;
    (c) a locking profile strip engaging both edges of said slit in sealing relationship, said locking profile strip being sufficiently rigid to support the weight of said envelope;
    (d) at least one suspension device attached to said locking profile strip for suspending said envelope from an object; and
    (e) supporting elements contained within said envelope and positioned at least at the longitudinal ends of said envelope.

2. The cable splice enclosure sleeve of claim 1, wherein sleeve heads having conical cable introduction connectors are positioned at the longitudinal ends of said envelope, said connectors having axes oriented at acute angles relative to an axis of the sleeve.

3. The cable splice enclosure sleeve of claim 2, wherein said sleeve heads include cylindrical walls that extend into the sleeve to serve as said supporting members.

4. The cable splice enclosure sleeve of claim 1, wherein said locking profile strip is formed so as to be substantially H-shaped in cross section and to include two longitudinal channels that engage the edges of said slit of said envelope and a central chamber situated between the two channels within which an anchor for said suspension device is contained.

5. The cable splice enclosure sleeve of claim 4, wherein surfaces of said channels include an adhesive coating.

6. The cable splice enclosure sleeve of claim 4, wherein said anchor comprises a casting block which is attached to said suspension device 7. The cable splice enclosure sleeve of claim 1, wherein said locking profile strip comprises a longitudinal rail having channel therein and containing a grounding rail.

8. The cable splice enclosure sleeve of claim 1, wherein said suspension device comprises a U-shaped hook.

9. The cable splice enclosure sleeve of claim 8, wherein said suspension device further comprises a captive rapid action lock shackle.

10. The cable splice enclosure sleeve of claim 8, including a cable clamp engaging said suspension device, that projects into the interior of said envelope and that has a V-shaped profile within which cables are received, said gable clamp being detachable from the remainder of said suspension device.

11. The cable splice enclosure sleeve of claim 10, wherein surfaces of said cable clamp facing toward cables received therein include notchings or toothings so as to provide non-skid surfaces.

12. The cable splice enclosure sleeve of claim 1, wherein said suspension device includes a hook having an extension that extends into said envelope and a strap that encircles said envelope and that is threaded through the slot.

13. The cable enclosure sleeve of claim 1, wherein said envelope comprises a reinforcement member along each slit edge.

14. The cable splice enclosure sleeve of claim 1, wherein said envelope comprises an all around transverse corrugation.

15. The cable splice enclosure of claim 13, wherein said reinforcement member comprises a thickened cross-section of said envelope.

16. The cable splice enclosure of claim 14, wherein said reinforcement member comprises a backwardly bent slit edge.

17. The cable splice enclosure of claim 1, wherein said envelope comprises a flexible, multi-layer foil.

18. The cable splice enclosure of claim 17, wherein said foil comprises:
(a) a cover layer made of a polymeric plastic;
(b) a reinforcing layer;
(c) a metal foil layer; and
(d) adhesion layers operatively securing the other layers together.

19. The cable splice enclosure of claim 18, wherein said cover layer is constructed of polyethylene, said adhesion layers comprise polyethylene acrylic acid ester, said reinforcing layer comprises glass fibers, and said metal foil layer comprises a steel film.

20. The cable splice enclosure of claim 17, wherein said foil comprises:
(a) a cover layer composed of a polymeric plastic;
(b) reinforcing layer that comprises a planar cavitated profile, wherein the cavities are filled with a plastic sealing material;
(c) a metal foil layer; and
(d) adhesion layers operatively securing said other layers together.

21. The cable splice enclosure of claim 20, wherein said plastic sealing material is bitumen sealing compound, said adhesion layers comprise polyethylene acrylic acid ester, said cover layer comprises polyethylene, and said metal foil layer comprises a steel film.

22. The cable splice enclosure of claim 17, wherein said foil comprises:
(a) a cover layer constructed of a polymeric plastic;
(b) a first metal foil layer adjacent the cover foil layer;
(c) a reinforcing layer adjacent said first metal foil layer;
(d) a second metal foil layer positioned adjacent said reinforcing layer; and
(e) adhesion layers operatively securing said other layers together.

23. The cable splice enclosure sleeve of claim 22, wherein said cover layer comprises polyethylene, said first metal foil layer comprises a steel film, said reinforcing layer comprises glass fibers, and said second metal foil layer comprises steel film.

24. The cable splice enclosure sleeve of claim 17, wherein said foil comprises:
(a) a cover layer constructed of a polymeric plastic;
(b) a reinforcing layer;
(c) a plastic layer;
(d) a metal foil layer; and
(e) adhesion layers operatively securing said other layers together.

25. The cable splice enclosure sleeve of claim 24, wherein said cover layer comprises polyethylene, said reinforcing layer comprises glass fibers, said plastic layer comprises polyethylene, said metal foil comprises a steel film, and said adhesion layers comprise a copolymer such as polyethylene acrylic acid ester.

26. An aerial sleeve comprising:
an envelope constructed of a flexible material said envelope being tubular shaped and longitudinally slit along its length;
(b) a rigid member attached to said envelope, said rigid member securely capturing edges of said slit in sealing relationship;
(c) a suspension member attached to said rigid member to suspend said sleeve from an object;
(d) support members positioned within said envelope, said support members supporting said envelope against collapse.

27. A cable splice enclosure, comprising:
(a) a flexible envelope, said envelope being tubular shaped and having a slit along its length;
(b) a rigid rail member attached to said envelope along said slit, said rail member capturing edges of said slit in sealing relationship;
(c) at least one suspension member attached to said rigid rail member to suspend said sleeve from an object; and
(d) support members positioned within said envelope, said support member supporting said envelope against collapse.

* * * * *